Figure 1:
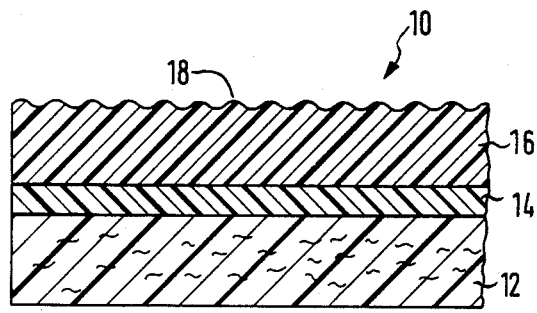

United States Patent [19]

Gey et al.

[11] Patent Number: 4,567,085

[45] Date of Patent: Jan. 28, 1986

[54] FLOOR COVERING, ESPECIALLY FOR AIRPLANES

[75] Inventors: Mathias Gey, Buxtehude; Jürgen Grote, Hamburg; Horst Pittel, Munich; Gerd W. Samol, Heimenkirch; Rainer Zelt, Lindau, all of Fed. Rep. of Germany

[73] Assignee: Metzeler Kautschuk GmbH, Munich, Fed. Rep. of Germany

[21] Appl. No.: 578,280

[22] Filed: Feb. 8, 1984

[30] Foreign Application Priority Data

Feb. 8, 1983 [DE] Fed. Rep. of Germany ....... 3304232

[51] Int. Cl.$^4$ .................. B32B 3/30; B32B 25/02; B32B 25/08; B32B 25/20
[52] U.S. Cl. .................................. 428/163; 428/229; 428/251; 428/266; 428/288; 428/429; 428/436; 428/447; 428/448; 428/920

[58] Field of Search ............... 428/163, 229, 251, 266, 428/288, 429, 436, 447, 448, 920

[56] References Cited

U.S. PATENT DOCUMENTS 4,419,474 12/1983 Ackermann et al. ............... 524/188

FOREIGN PATENT DOCUMENTS 0051212 12/1982 European Pat. Off. .

Primary Examiner—James C. Cannon
Attorney, Agent, or Firm—Herbert L. Lerner; Laurence A. Greenberg

[57] ABSTRACT

A floor covering, includes a substrate in the form of a resin based laminate having reinforcing fibers disposed therein, and a layer of fire-resistant polysiloxane vulcanized on the surface of the laminate.

14 Claims, 2 Drawing Figures

FLOOR COVERING, ESPECIALLY FOR AIRPLANES

The invention relates to a floor covering, especially for airplanes, having a substrate and a synthetic material layer applied to the surface of the substrate.

In the cabin of commercial airplanes, the floor plates are covered with a textile carpet or floor covering and with a non-textile covering or layer (NTF).

The non-textile floor covering, which will be merely referred to as a floor covering below, is installed in the cockpit and in wet areas, i.e. toilets and galleys, by cementing it to the floor plates.

For bridging seat rails and for protecting the floor plates against perforation of the NTF at highly concentrated loading points, such as where pointed heels may be used, a GFK plate is installed before cementing.

This separate installation of NTF and GFK plates is disadvantageous, because of the high labor requirement necessary for the separate cutting and cementing of the two components.

An additional problem is the high weight per unit area of this construction, resulting from the fact that the NTF requires a certain minimum wall thickness below the structured surface for its own stability. Furthermore, the NFT covering used at present does not fullfil the latest requirements of the aviation industry with respect to limiting the generation and toxicity of fumes in the case of fire, requirements which are also made by other branches of industry, to an increasing degree.

It is accordingly an object of the invention to provide a floor covering, especially for airplanes, which overcomes the hereinafore-mentioned disadvantages of the heretofore-known products of this general type.

In particular, a floor covering is proposed which, in spite of its small thickness, and the resulting low weight per unit area, still guarantees the required wear resistance, and develops little smoke and few toxic gases in case of fire.

With the foregoing and other objects in view there is provided, in accordance with the invention, a floor covering, comprising a substrate in the form of a resin based laminate having reinforcing fibers disposed therein, and a layer of fire-resistant polysiloxane composition vulcanized on the surface of said laminate, said polysiloxane composition comprising (a) a diorganopolysiloxane of the formula

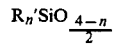

n which n is 1.9 to 2.05, and $R^1$ is an alkyl, alkenyl and/or aryl radical with 1-8 C-atoms, (b) a finely divided silicic acid, (c) finely divided $TiO_2$ with a surface area, measured by the BET method, greater than 20 m²/g and a particle size less than 0.5 μm, (d) platinum and/or one of its sulphur-free compounds, (e) a curing agent, and (f) a nitrogen compound selected from the group consisting of uric acid, guanine, melamine and a compound of the general formula

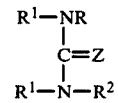

in which

R is H, phenyl, alkyl with 1-6 C atoms, tolyl, nitrile, $-NHR^2$, $-CH_2OR^2$, $-CH_2COOR^2$, $-C(=NH)NHR^2$, $-CO-NH-R^2$ or $(R^1)_2C-$, $R^1$ is H, alkyl with 1-6 C atoms, $Si(CH_3)_3-$ or R $R^2$ is H or $-CO-R$ and Z is NH, O or NR, or a salt thereof.

In accordance with another feature of the invention, the fiber reinforced laminate has a phenol resin base.

In accordance with a further feature of the invention, the reinforcing fibers are glass, cotton, aramide or polyamide fibers.

In accordance with an added feature of the invention, the laminate contains a sheet of fabric, especially fabric having glass fibers.

In accordance with an additional feature of the invention, the polysiloxane layer is formed of diorganopolysiloxane, finely distributed silicic acid and/or filler materials, finely distributed titanium dioxide, platinum, a hardening agent, and a nitrogen compound.

In accordance with again another feature of the invention, there is provided a primer layer or coat disposed between the laminate and the polysiloxane layer.

In accordance with again a further feature of the invention, the primer layer is a moisture sensitive solution of multi-functional silanes or polysiloxanes in organic solvents.

In accordance with a concomitant feature of the invention, the polysiloxane layer has an upper surface having a structured profile in the form of grooves formed therein.

The advantages obtained through the use of the invention are based on the use of flame resistant polysiloxanes, as described in Published European Patent Application No. 0 051 212 of the firm Bayer AG and U.S. Pat. No. 4,419,474. These polysiloxanes fullfil all fire safety requirements to an optimal degree, as has been ascertained by suitable fire testing; this applies even for the very rigid requirements of the aviation industry with respect to smoke density and toxicity in case of fire.

The layer of fire resistant polysiloxane is vulcanized with a relatively small thickness onto a fiber reinforced laminate which furnishes the necessary mechanical strength of the structure. The laminate can be based on a phenol resin or some other resin base. Good results were achieved with glass fiber or cotton reinforcement. The reinforcement can also be inserted as a sheet or fabric.

The rigid laminate plate guarantees not only an outstanding dimensional stability of the floor covering, but also prevents perforation of the floor covering, even when stewardesses or passengers wear shoes with pencil-like high heels. Furthermore, a floor covering containing a laminate-plate as a carrier, is easier to cement to the floor plates than a floor covering consisting only of polysiloxane. Additionally, such a laminate plate has a sufficient mechanical strength even with a relatively small thickness, so that the thickness of the whole floor covering, and accordingly its weight per unit area, can be kept extremely low, as required for the development of modern aircraft in order to save fuel.

The laminate has a thickness of about 0.5–0.8 mm, while the layer of polysiloxane should have a thickness of about 0.3 to 0.5 mm. If the polysiloxane layer is provided with a structured profile, the value given for the thickness relates to the thickness at the lowest points of the contour.

The optional structuring of the polysiloxane layer should be made in the form of grooves, so that fluids can run off in a given direction. Furthermore, the profile should prevent spilled liquids from spreading out extensively. Good results were obtained with a profile structure imitating a parallel knurl with grooves running parallel to each other.

In order to improve the bonding between the laminate and the layer made of fire resistant polysiloxane, the surface of the laminate is provided with a primer or a priming coat before the polysiloxane is applied; good results were obtained with a primer coating with moisture sensitive solutions of multi-functional silanes or polysiloxanes in organic solvents. Such products are marketed, for example, by the firm Wacker-Chemie GmbH, under the designation VP 3243, or by the firm Bayer AG under the designation HV-L.

Such a floor covering can be manufactured on a rotary vulcanizing machine, which is also known as an "AUMA", wherein the production can be carried out in one or two steps as desired.

If the process is carried out in one step, the rotary vulcanizing machine serves for the application of the polysiloxane layer onto the laminate, as well as for the vulcanization of the polysiloxane layer, while in the two-step process, the polysiloxane layer is first applied onto the surface of the laminate in the gap between the rollers, and then in a second operation the polysiloxane layer is vulcanized onto the laminate by means of a rotary vulcanizing machine.

If the layer of polysiloxane is provided with a profiled structure as mentioned above, a rotary vulcanizing machine having a surface with a corresponding structure or profile is used, according to a preferred embodiment of the invention.

Other features which are considered as characteristic for the invention are set forth in the appended claims.

Although the invention is illustrated and described herein as embodied in a floor covering, especially for airplanes, it is nevertheless not intended to be limited to the details shown, since various modifications and structural changes may be made therein without departing from the spirit of the invention and within the scope and range of equivalents of the claims.

Figure 2:
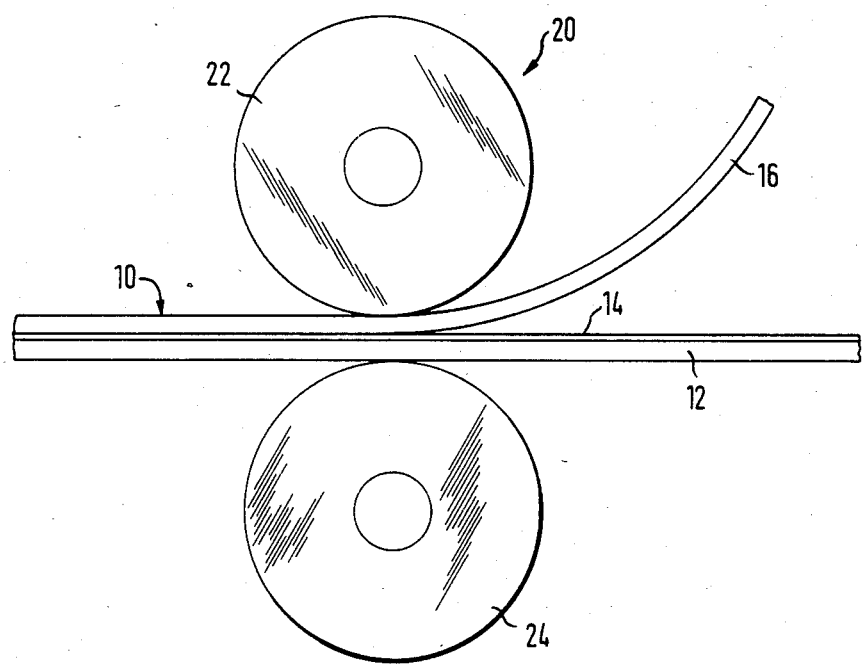

The construction and method of operation of the invention, however, together with additional objects and advantages thereof will be best understood from the following description of specific embodiments when read in connection with the accompanying drawings, in which:

FIG. 1 is a fragmentary, diagrammatic, cross-sectional view of a floor covering on an enlarged scale; and FIG. 2 is a side-elevational view showing the basic principle for manufacturing such a floor covering in a one-step process by means of an AUMA machine.

Referring now to the figures of the drawing in detail and first particularly to FIG. 1 thereof, there is seen a floor covering which is designated in general with reference number 10 and is used for wet areas and for the cockpit of an airplane. The floor covering 10 includes a lower layer made of a laminate 12, formed of a phenol or other resin which is reinforced by fibers. The fibers can be glass, cotton, polyamide or aramide fibers which are embedded in the resin in the form of a textile or sheet of fabric.

This relatively rigid laminate layer 12 which gives the floor covering its mechanical strength, has a thickness of about 0.5–0.8 mm.

As shown in FIG. 1, a primer or priming coat 14 is applied to the upper surface of the laminate 12.

This priming coat may be formed of a moisture sensitive solution of multi-functional silanes or polysiloxanes in organic solvents; good result were achieved with priming coats of VP 3243 and G719, marketed by the firm Wacker-Chemie GmbH, Munich, Germany or Xylopren coupling agent HV-L marketed by the firm Bayer AG.

A layer 16 made of a fire-resistant polysiloxane is subsequently vulcanized onto the priming coat 14. The layer is similar to a fire-resistant polysiloxane described under European Patent Application No. 0 051 212 in Published European Patent Application No. 81108679.2 of Bayer AG and U.S. Pat. No. 4,419,474. This flameproof polysiloxane is formed of a diorgano-polysiloxane, finely distributed silicic acid or silica, and/or other filler materials, finely distributed titanium-dioxide, platinum, a hardening agent, and a nitrogen compound. The vulcanization of the siloxane is effected by peroxidic polymerization.

The free surface of the polysiloxane layer 16, serving as a walking surface, is provided with a structured contour as indicated by the regular corrugations 18 in FIG. 1. This structure is made in the form of parallel grooves suitable for imitating a knurled pattern.

FIG. 2 shows a rotary vulcanizing machine known as an "AUMA" which is provided with a heating roller 22 and an opposing roller 24, that is used to carry out a one-step process for producing a floor covering of this type. The heating roller 22 has a non-illustrated groove-shaped surface structure, with the grooves running parallel to the axis of the heating roller 22. This grooved structure provides the above-mentioned imitation knurling on the free surface of the layer 16.

The laminate 12 with the priming coat 14 is combined with the layer 16 made of polysiloxane in the gap between the two rollers 22 and 24. The polysiloxane layer 16 is rolled-off from a roller which is also known as a "cocoon", which is a roll of uncured rubber.

The heating roller 22 rotates at a relatively slow speed, so that, for example, 12 minutes are required for a single revolution. The gap between the rollers has a width which is variable so that it can be adjusted for the thickness of the floor covering 10 which is to be produced. The layer 16 made of polysiloxane and the laminate 12 are pressed together in the gap, and at the same time the polysiloxane is vulcanized in a step which will be referred to as step A, by the temperature of the heating roller 22, which is about 160° C.

After leaving the rotary vulcanizing machine 20, the layer 16 of polysiloxane is securely bonded to the laminate 12; subsequently, the layered product is additionally tempered or vulcanized again in a vulcanization step which will be referred to as step B.

Since the laminate 12 is relatively rigid, this tempering must be performed while the layered product is in a flat state.

In a finished floor covering 10, the laminate 12 has a thickness of about 0.5–0.8 mm, while the layer 16 of polysiloxane has a thickness of 0.3 to 0.5 mm, which is always measured at the lowest points of the profile or corrugations 18.

As an alternative to the manufacturing method explained above with the aid of FIG. 2, the roller 22 can be unheated, so that the layer 16 of polysiloxane is pressed onto the laminate 12 at room temperature. In a second step, this layered assembly is then vulcanized by an AUMA machine corresponding to the illustration shown in FIG. 2, with the tempering of step B following this vulcanization.

Before the priming coat 14 is applied, the surface of the laminate 12 must be prepared in the conventional way and it is especially important for it to be cleaned and dried. In some cases it is necessary to let the laminate with the priming coat applied, air dry for at least 15 minutes.

The foregoing is a description corresponding in substance to German Application No. P 33 04 232.2, dated Feb. 8, 1983, the International priority of which is being claimed for the instant application, and which is hereby made part of this application. Any material discrepancies between the foregoing specification and the aforementioned corresponding German application are to be resolved in favor of the latter.

We claim:

1. Floor covering, comprising a substrate in the form of a resin based laminate having reinforcing fibers disposed therein, and a layer of fire-resistant polysiloxane composition vulcanized on the surface of said laminate, said polysiloxane composition comprising
   (a) a diorganopolysiloxane of the formula

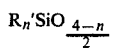

in which n is 1.9 to 2.05, and $R^1$ is an alkyl, alkenyl and/or aryl radical with 1–8 C-atoms,
   (b) a finely divided silicic acid,
   (c) finely divided $TiO_2$ with a surface area, measured by the BET method, greater than 20 $m^2/g$ and a particle size less than 0.5 $\mu m$,
   (d) platinum and/or one of its sulphur-free compounds,
   (e) a curing agent, and
   (f) a nitrogen compound selected from the group consisting of uric acid, guanine, melamine and a compound of the general formula

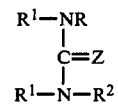

in which
   R is H, phenyl, alkyl with 1–6 C atoms, tolyl, nitrile, $-NHR^2$, $-CH_2OR^2$, $-CH_2COOR^2$, $-C(=NH)NHR^2$, $-CO-NH-R^2$ or $(R^1)_2C-$,
   $R^1$ is H, alkyl with 1–6 C atoms, $Si(CH_3)_3-$ or R
   $R^2$ is H or $-CO-R$ and
   Z is NH, O or NR, or a salt thereof.

2. Floor covering according to claim 1, wherein said fiber reinforced laminate has a phenol resin base.

3. Floor covering according to claim 1, wherein said reinforcing fibers are glass fibers.

4. Floor covering according to claim 2, wherein said reinforcing fibers are cotton fibers.

5. Floor covering according to claim 1, wherein said reinforcing fibers are cotton fibers.

6. Floor covering according to claim 2, wherein said reinforcing fibers and glass fibers.

7. Floor covering according to claim 1, wherein said reinforcing fibers are selected from the group consisting of aramide and polyamide fibers.

8. Floor covering according to claim 2, wherein said reinforcing fibers are selected from the group consisting of aramide and polyamide fibers.

9. Floor covering according to claim 1, wherein said laminate contains a sheet of fabric.

10. Floor covering according to claim 1, wherein said laminate contains a sheet of fabric having glass fibers.

11. Floor covering according to claim 1, including a primer layer disposed between said laminate and said polysiloxane layer.

12. Floor covering according to claim 11, wherein said primer layer is a moisture sensitive solution of multi-functional silanes.

13. Floor covering according to claim 11, wherein said primer layer is a mositure sensitive solution of polysiloxanes in organic solvents.

14. Floor covering according to claim 1, wherein said polysiloxane layer has an upper surface having grooves formed therein.

* * * * *